US011913215B2

(12) United States Patent
Krampl et al.

(10) Patent No.: US 11,913,215 B2
(45) Date of Patent: Feb. 27, 2024

(54) TRUSS SECTION CONNECTION REGION

(71) Applicant: INVENTIO AG, Hergiswil (CH)

(72) Inventors: David Krampl, Vienna (AT); Michael Matheisl, Vienna (AT); Richard Schütz, Vienna (AT); Robert Schulz, Vienna (AT); Thomas Koukal, Neulengbach (AT)

(73) Assignee: INVENTIO AG, Hergiswil (CH)

( * ) Notice: Subject to any disclaimer, the term of this patent is extended or adjusted under 35 U.S.C. 154(b) by 358 days.

(21) Appl. No.: 17/434,240

(22) PCT Filed: Feb. 18, 2020

(86) PCT No.: PCT/EP2020/054182

§ 371 (c)(1),
(2) Date: Aug. 26, 2021

(87) PCT Pub. No.: WO2020/173753

PCT Pub. Date: Sep. 3, 2020

(65) Prior Publication Data

US 2022/0145610 A1 May 12, 2022

(30) Foreign Application Priority Data

Feb. 27, 2019 (EP) .................................... 19159574

(51) Int. Cl.
*E04C 3/08* (2006.01)
*E04B 1/19* (2006.01)
(Continued)

(52) U.S. Cl.
CPC ............ *E04B 1/2403* (2013.01); *B66B 23/00* (2013.01); *E04C 3/08* (2013.01); *E04B 1/5812* (2013.01);
(Continued)

(58) Field of Classification Search
CPC ........ E04B 1/19; E04B 1/2403; E04B 1/5812; E04B 2001/2415; E04B 2001/2418;
(Continued)

(56) References Cited

U.S. PATENT DOCUMENTS 4,811,829 A * 3/1989 Nakazawa .............. B66B 23/00 403/14
4,832,169 A * 5/1989 Goto ...................... B65G 21/02 53/446
(Continued)

FOREIGN PATENT DOCUMENTS

CN 87103436 A 12/1987
CN 201211999 Y 3/2009
(Continued)

OTHER PUBLICATIONS

International Search Report for International Application No. PCT/EP2020/054182 dated Nov. 5, 2020.

*Primary Examiner* — Douglas A Hess
(74) *Attorney, Agent, or Firm* — Knobbe Martens Olson & Bear LLP

(57) ABSTRACT

A framework section having a connection region which is formed on the end face of at least one of its two ends. The connection region can be connected to the connection region of a further framework section. The framework section can include two upper chord sections and two lower chord sections, which extend parallel to one another in the longitudinal direction of the framework section and are connected to one another by connecting struts such that they define a cuboid space. The upper chord sections and the lower chord sections can have a tubular cross section, wherein the upper chord sections and the lower chord sections can also be configured to transition from the tubular cross section into an I-shaped cross section in the connection region.

15 Claims, 5 Drawing Sheets

(51) Int. Cl.
*B66B 23/00* (2006.01)
*E04B 1/24* (2006.01)
*E04B 1/58* (2006.01)
*E04C 3/04* (2006.01)

(52) U.S. Cl.
CPC ................. *E04B 2001/2415* (2013.01); *E04B 2001/2418* (2013.01); *E04B 2001/2448* (2013.01); *E04C 2003/0491* (2013.01)

(58) Field of Classification Search
CPC ............... E04B 2001/2448; E04C 3/08; E04C 2003/0491; B66B 23/00
USPC .......................................................... 198/321
See application file for complete search history.

(56) References Cited

U.S. PATENT DOCUMENTS

| | | | | |
|---|---|---|---|---|
| 6,814,215 | B2 * | 11/2004 | Krampl | B66B 23/00 198/321 |
| 8,745,954 | B2 * | 6/2014 | Simmons | E04B 1/2403 403/231 |
| 9,719,243 | B2 * | 8/2017 | Mason | F16B 7/185 |
| 10,053,335 | B2 * | 8/2018 | González | B66B 23/00 |
| 10,150,650 | B2 * | 12/2018 | Illedits | B65G 21/02 |
| 10,180,007 | B1 | 1/2019 | Santini | |
| 10,760,261 | B2 * | 9/2020 | Richards | E04C 3/06 |
| 11,549,264 | B2 * | 1/2023 | Li | B66B 21/02 |
| 11,572,257 | B2 * | 2/2023 | Salojärvi | B66B 23/00 |

FOREIGN PATENT DOCUMENTS

| | | | |
|---|---|---|---|
| CN | 202429846 | U | 9/2012 |
| CN | 104003281 | A | 8/2014 |
| CN | 105151985 | A | 12/2015 |
| CN | 109052128 | A | 12/2018 |
| EP | 0345525 | A2 | 12/1989 |
| EP | 3150539 | A1 | 4/2017 |
| ES | 2080653 | A2 | 2/1996 |
| JP | H09287200 | A | 11/1997 |
| JP | 2011256033 | A | 12/2011 |
| JP | 2013193843 | A | 9/2013 |
| JP | 5961559 | B2 | 8/2016 |
| WO | WO 201148437 | A1 | 4/2011 |
| WO | WO 2018078525 | A1 | 5/2018 |

* cited by examiner

TRUSS SECTION CONNECTION REGION

TECHNICAL FIELD

The present disclosure relates to the configuration of a framework for a passenger transport system such as an escalator, a moving walk or the like.

SUMMARY

Passenger transport systems are used to transport passengers between different levels or within a constant level, for example in buildings. Escalators, which are also referred to as moving stairs, are regularly used, for example, to transport people in a building from one floor to another floor. Moving walkways can be used to transport passengers within a floor in a horizontal plane or in a merely slightly inclined plane.

Passenger transport systems generally have a framework, which serves as a load-bearing structure. The framework is designed to absorb static and dynamic forces acting on the passenger transport system, such as weight forces of transported people, forces caused by a drive of the passenger transport system and so forth, and to transmit such forces for example to structures of the building that accommodate the passenger transport system. For this purpose, the passenger transport system can be mounted and fastened to the building at suitably formed support points. Depending on the area of use, the framework can extend, for example, over two or more levels or floors of the building and/or over shorter or longer distances within a level floor within the building.

A framework supported in the assembled state at the support points of the building can accommodate both movable and stationary components of the passenger transport system. Depending on the configuration of the passenger transport system as an escalator or moving walk, such components can be formed, for example, as a step band, pallet band, deflection shafts, drive shafts, drive motor, transmission, control, monitoring system, security system, balustrades, comb plates, bearing points, conveyor belt and/or guide rails.

A framework is generally composed of a plurality of interconnected load-bearing framework components. Such framework components may include, for example, so-called upper chords and lower chords as well as connecting struts connecting these chords to one another, such as cross struts, diagonal struts, uprights and so forth. Additional structures such as gusset plates, angle plates, retaining plates, oil pan plates, bottom view plates etc. can also be provided.

In order to ensure sufficient stability and load-bearing capacity of the framework, the individual framework components must be connected to each other with sufficient stability. Usually the framework components are welded or riveted together for this purpose. As a rule, each individual framework component must be welded together with other framework components of the framework in a manner that renders them stable and capable of bearing loads.

Depending on the location, an escalator or moving walk can have a considerable conveying length of 30 meters or more. Starting at a certain length or span of the framework, the angle profile bars disclosed in EP 0 345 525 A2 and commonly used for frameworks can lead to problems, for example in relation to the known phenomenon of lateral torsional buckling. In general, the risk of a truss failing due to lateral torsional buckling lessens as the smallest and the largest area moments of inertia of the associated cross section get closer to each other. For this reason, the classic steel profiles are particularly at risk. In addition, the position of the beam, the distance between the bearing points and its resilience to torsion are of great importance. Closed hollow profiles such as pipes are particularly resilient here.

In view of this problem, a framework for a long escalator which has upper and lower chords with a tubular cross section is proposed, for example, in CN 202429846 U. However, these long passenger transport systems, and in particular their framework, can no longer be transported in one piece from the place of manufacture to the place of use. Such a framework therefore usually consists of at least two framework sections that can be connected to each other via a connection region.

The connection region disclosed in CN 202429846 U has junction plates which are welded to the end face of the upper chord or lower chord and which are provided with screw holes. However, this construction has the disadvantage that the junction plates either protrude into the cuboid space defined by the framework or protrude into the surrounding environment. In the case of junction plates protruding into the cuboid space, the usable cross section of the framework is reduced massively with regard to the arrangement of guide rails, the handrail return and conveyor belt return and, in the case of protruding junction plates, either the aesthetics of the escalator are impaired or massively larger cladding parts are required to hide the junction plates in the finished passenger transport system. Moreover, in this embodiment the flow of force in the connection region is deflected massively, so that when the tensile forces in the lower chord are high, the junction plates tend to bulge (membrane tension state) and high stress concentrations occur at the weld seams between the tubular cross section of the lower chord and the junction plate.

An object of the present disclosure is to create a framework section of the aforementioned type, the connection region of which enables a maximum usable cross section of the cuboid space without increasing the overall cross section and ensures an optimized flow of force through the connection region.

This task is solved by a framework section of a framework for a passenger transportation system. This framework section has a connection region which is formed on the end face of at least one of the two ends of the framework section. This connection region can be connected to the connection region of at least one further framework section. The framework section in each case contains two upper chord sections and two lower chord sections which extend parallel to one another in the longitudinal direction of the framework section and are connected to one another by connecting struts. Upper chord sections, lower chord sections and connecting struts joined together to form the framework section define a cuboidal space which, after assembly, can be covered with cladding parts closing it off from the surrounding environment and in which further components of the passenger transport system such as guide rails, a conveyor belt (step belt or pallet belt) and so forth can be accommodated or arranged. In order to achieve a greater stability compared to the usual angle profiles, the upper chord sections and the lower chord sections have a tubular cross section. Furthermore, the upper chord sections and the lower chord sections are configured in the connection region to transition from the tubular cross section into an I-shaped cross section. In this arrangement, the connection region is not simply the flat end of the upper chord section or lower chord section, but extends from the end thereof to the point at which the tubular cross section of the upper chord section or lower chord section has a constant shape over the longitudinal extension.

In other words, this configuration replaces the hollow space of the tubular cross section in the connection region by lateral indentations of the I-shaped cross section. These indentations can then accommodate one or more fasteners or fastening means such as screws, rivets, pins, bolts and so forth, the central longitudinal axes of which preferably extend parallel to the longitudinal direction of the framework section or to the upper chord sections and lower chord sections. Since the I-shaped cross-section is only present in the connection region, it is supported against torsional forces by the tubular cross-section of the remaining upper chord section or lower chord section and is itself too short to fail as a consequence of lateral torsional buckling. In addition, by moving the fastening means into the indentations, it is possible to attain a very direct flow of force from the connection region of the framework section to the connection region of a subsequent framework section firmly connected to it.

With regard to the torsional rigidity, profiles with symmetrical, tubular cross sections are preferably selected for the upper chord sections and lower chord sections. In one embodiment, the upper chord section or the lower chord section has the tubular cross section of a square tube profile. As a result, flat surfaces are present on the upper chord section and on the lower chord section, which substantially simplify the manufacture of the framework section. In particular, this means that no complicated connection surfaces are required on the connecting struts connecting the upper chord sections and lower chord sections, as would be necessary, for example, in the case of round pipes.

In a variant of the connection region, the transition from the tubular cross section to the I-shaped cross section can be configured continuously by means of shaping and/or molding. Forming can be carried out, for example, by hammering, forging, pressing, deep drawing and so forth of the tubular upper chord section or lower chord section arranged in the connection region. Material-forming manufacturing processes, such as 3D printing processes, build-up welding and so forth, can be used for molding.

In a further variant of the connection region, the transition from the tubular cross section into the I-shaped cross section can be configured discontinuously by joining an I-profile piece to the end face of the tubular upper chord section or lower chord section. An intermediate plate is preferably inserted between the tubular upper chord section or lower chord section and the I-profile piece in order to create a more harmonious transition for the flow of force and the necessary load-bearing weld seam length between the parts.

Of course, the I-profile piece does not necessarily have to have a constant shape with regard to its cross section over its longitudinal extension. The I-profile piece can also be shaped in such a way that it has a tubular cross section at one end and an I-profile cross section at the other end, with an intermeshing configuration being present in between. A component designed in this way can be produced, for example, by drop forging, casting, by means of 3D printing and so forth, and can preferably be connected to the tubular upper chord section or lower chord section by means of integral connection techniques such as welding, gluing, soldering and so forth.

The I-profile piece has two flanges arranged in parallel planes and connected to one another by a web. The I-profile piece can be made from commercially available profile steels, such as those defined in the German industrial standard DIN 1025.

In order to improve the accessibility to the fastening means for tools, such as a torque wrench, at least one of the two flanges can be arranged asymmetrically with respect to the web or have a recess.

In order to ensure sufficient torsional rigidity of the upper and lower chords as well as sufficient installation clearance for the fasteners or fastening means, the length of the I-profile piece should correspond to one to five times the height of the tubular cross-section. However, it preferably corresponds to two to three times the height of the tubular cross section, particularly preferably two and a half times the height of the tubular cross section.

In one embodiment, at the end face to the end of the upper chord or lower chord that opens into the connection region a junction plate is fastened, the flat area of which is subsequently arranged orthogonally with respect to the longitudinal direction of the framework section on the I-shaped cross section in the connection region. The framework sections can be connected to one another via the junction plates by means of connecting elements. Of course, a junction plate does not necessarily have to be fastened if there are other mounting options for the fastening means that are to be provided. Such can be, for example, integrally molded receptacles for screws, rivets, pins, clamps and so forth on the I-shaped cross section.

In a further embodiment, each of the junction plates has bores for receiving the connecting elements, the central longitudinal axes of the bores being arranged parallel to the longitudinal direction of the framework section. As a result, the connecting elements are subjected to tension in their longitudinal extension and not, for example, to shear or bearing stress. With two interconnectable junction plates of successive framework sections, the hole pattern of these bore holes should be the same.

As already mentioned, the frameworks are usually clad, which means that panels are attached to the outside. Since these are fairly large areas, which are covered with rather expensive materials such as stainless steel or coated steel sheets, the external dimensions of the framework should be kept as small as possible, particularly with regard to its width and height. It is therefore particularly important that no parts, such as the junction plates, protrude beyond the lateral surfaces of the upper and lower chords in the region of these surfaces of the framework to be clad. Preferably, therefore, at least the surfaces of the junction plate and, if present, also of the intermediate plate and of the I-profile piece that face away from the environment surrounding the cuboid space and extend in the longitudinal direction are arranged in alignment with the corresponding lateral surfaces of the upper chord section or the lower chord section with respect to the longitudinal extension.

For vertical stabilization, the junction plate of the upper chord section can respectively be connected to the junction plate of the lower chord section by a vertical strut in the connection region of the framework section. In this way, the hole patterns of the two junction plates can be fixed in relation to one another, so that no adaptation work is required when the framework sections are joined together to form a framework.

According to the disclosure, a framework of a passenger transport system has at least two framework sections of the aforementioned type, each of the adjoining framework sections being firmly connected to one another in the connection region by fasteners or fastening means. Of course, a framework can also be divided into three or more framework sections. In this case, the middle framework sections each logically have the described connection regions formed on the end faces at both ends.

BRIEF DESCRIPTION OF THE DRAWINGS

Preferred exemplary embodiments of the disclosure are explained in more detail in the description below on the basis of the attached drawings, wherein corresponding elements are provided with the same reference characters in all figures. Neither the drawings nor the description are to be interpreted as limiting the disclosure. Shown are.

DETAILED DESCRIPTION

Figure 1:
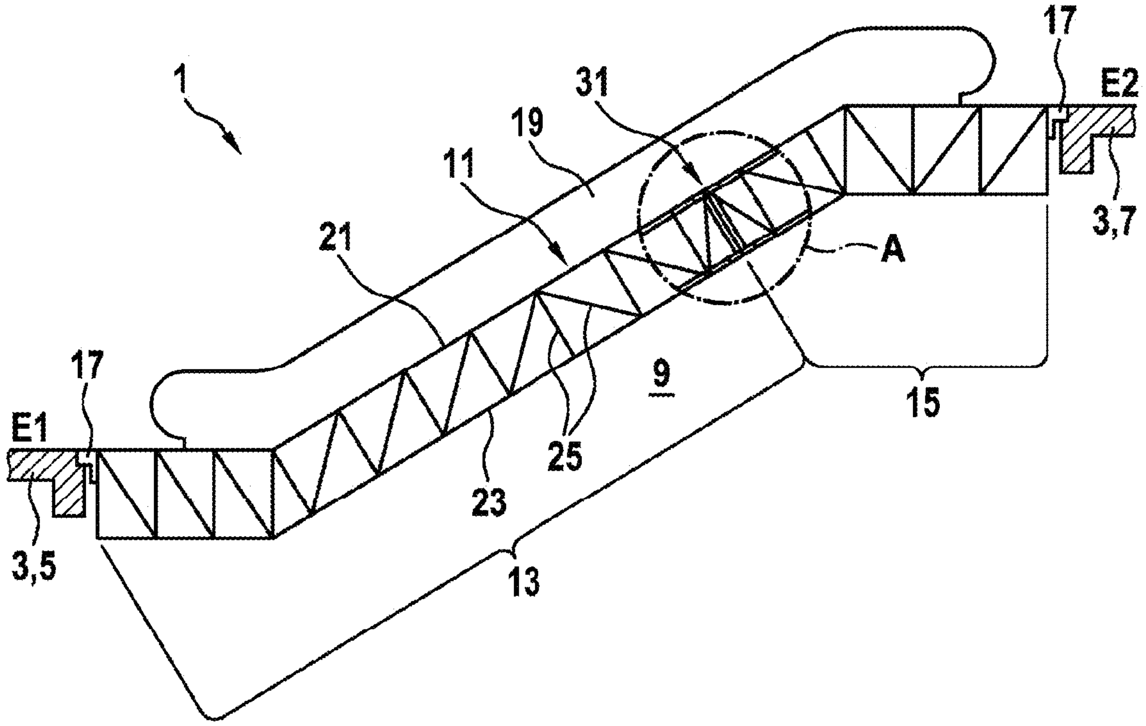
FIG. 1 schematically in the side view, a passenger transport system with a framework composed of two framework sections.

FIG. 1 shows schematically in side view a passenger transport system 1 configured as an escalator or moving walk which connects a first floor level E1 to a second floor level E2 of a building 3. The passenger transport system 1 has a framework 11 composed of two framework sections 13, 15. The framework 11 is supported on the floors 5, 7 of the floor levels E1, E2 of the building 3 via two support brackets 17 arranged at the end face and spans the intermediate space 9 between the floor levels E1, E2 like a bridge. As is only indicated by the balustrade 19, the framework 11 holds all the other components of the passenger transport system 1 in a load-bearing manner and supports them on the building 3.

Since the shown framework 11 has two framework sections 13, 15, these are connected to one another by means of connection regions 31 at the position designated as section A. Detachable connecting means such as high-strength screws are usually used to connect the connection regions 31 of two framework sections 13, 15.

Figure 2:
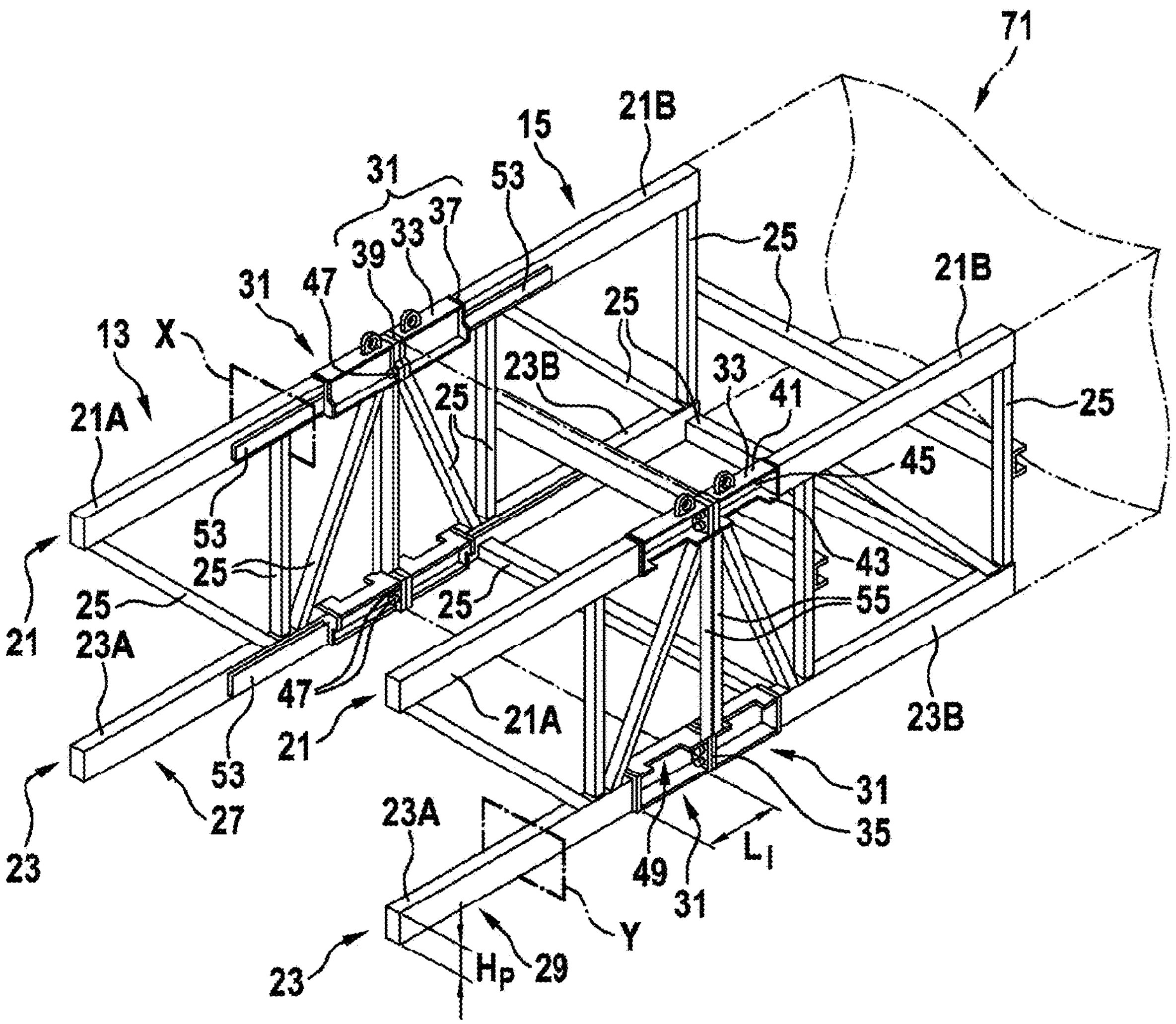
FIG. 2 illustrates the detail A shown in FIG. 1 in an enlarged, three-dimensional view with a first variant of the connection region.

FIG. 2 shows the detail A indicated in FIG. 1 in an enlarged, three-dimensional view. Characteristic of frameworks 11 is their structure made up of upper chords 21, lower chords 23 and connecting struts 25. This structure essentially comprises two framework side parts 27, 29 arranged parallel to one another, each of these framework side parts 27, 29 being formed from an upper chord, lower chord and, arranged therebetween, connecting struts 25, all arranged in a vertical plane. The framework side parts 27, 29 are connected to one another in the region of the lower chords 23 by further connecting struts 25 extending between these side parts 27, 29, so that the framework 11 has a U-shaped cross section. For reasons of stability, the two framework side parts 27, 29 are also connected to one another by further connecting struts 25 at approximately half the height between the upper chord 21 and the lower chord 23. Depending on their arrangement in the framework 11, these connecting struts 25 are referred to in professional circles as uprights, diagonal struts, cross struts, bottom struts and so forth.

In particular, FIG. 2 also shows the interconnected connection regions 31 of the two framework sections 13, 15 in a first variant. The entire combination, that is to say the connection regions 31 which are firmly connected to one another by connecting means or connectors 47, is usually referred to as a framework joint.

Since the framework 11 is divided into framework sections 13, 15, the upper chords 21 and lower chords 23 are also subdivided, so that the parts that specifically belong to a framework section 13, 15 are referred to below as upper chord sections 21A, 21B and lower chord sections 23A, 23B.

As already mentioned, each framework section 13, 15 has a connection region 31 which is formed on the end face of one of the two ends of the framework section 13, 15. For reasons of clarity, only the upper framework section 15 which adjoins the floor level 2 is described below.

The upper framework section 15 respectively includes two upper chord sections 21B and two lower chord sections 23B, which extend parallel to one another in the longitudinal direction of the upper framework section 15 and are connected to one another by the connecting struts 25. The upper chord sections 21B, lower chord sections 23B and connecting struts 25 joined together to form the upper framework section 15 define a cuboid space 71, which, after the components of the passenger transport system 1 to be arranged in the cuboid space 71 have been installed, can be covered with cladding parts (not shown) closing it off from the surrounding environment. In order to achieve a greater stability compared to the angle profiles commonly used, the upper chord sections 21B and the lower chord sections 23B have the tubular cross section of a square tube. Furthermore, in the connection region 31 the upper chord sections 21B and the lower chord sections 23B are configured transitioning from the tubular cross section into an I-shaped cross section.

In the first variant of the connection region 31 shown in FIG. 2, the transition from the tubular cross section to the I-shaped cross section is configured discontinuously by an end-face joining of an I-profile piece 33 to the tubular upper chord section 21B or lower chord section 23B. An intermediate plate 37 is inserted between the tubular upper chord section 21B or lower chord section 23B and the I-profile piece 33 in order to create a more harmonious transition for the flow of force and the necessary load-bearing weld seam length between these parts.

The I-profile piece 33 has two flanges 41, 43 arranged in mutually parallel planes that are connected to one another by a web 45. The I-profile piece 33 can be made from commercially available profile steels, such as those defined in the German industrial standard DIN 1025.

Logically, the lower framework section 13 adjoining the floor level 1 is constructed in the same way as the upper framework section 15 described above.

In order to improve the accessibility to provided fastening means of fasteners 47 such as screws, rivets and so forth for tools such as a torque wrench, at least one of the two flanges 41, 43 can be arranged asymmetrically with respect to the web 45 and/or have a recess 49.

In order to ensure sufficient torsional rigidity of the upper chords 21 and lower chords 23 and sufficient clearance for the fastening means 47, the length $L_I$ of the I-profile piece 33 should correspond to one to five times the height $H_P$ of the tubular cross section of the lower chord 23 or upper chord 21. In the exemplary embodiment shown in FIG. 2, the length $L_I$ of the I-profile piece 33 corresponds to two and a half times the height $H_P$ of the tubular cross section.

In order for fastening means 47 to be installed, a junction plate 39 is provided on the end face in the connection region 31 of the upper chord section 21A, 21B at the end of the I-profile piece 33. A junction plate 35 also forms the end of the lower chord section 23A, 23B. The junction plates 35, 39 thus connect to the I-shaped cross section of the I-profile piece 33 with their planar extension orthogonally with respect to the longitudinal direction of the framework section 13, 15. The framework sections 13, 15 can be firmly connected to one another by means of the connecting elements 47 via these junction plates 35, 39. The intermediate plate 37 forming the connection region 31, the I-profile piece 33 and the junction plate 35, 39 can be connected to the tubular upper chord section 21A, 21B or lower chord section 23A, 23B via integral connection techniques such as welding, gluing, soldering and the like.

For vertical stabilization, the junction plate 39 of the upper chord section 21A, 21B is connected to the junction plate 35 of the lower chord section 23A, 23B by a vertical strut 55 in the connection region 31 of the framework section 13, 15. As a result, the hole patterns of the two junction plates 35, 39 described below can be spatially fixed in relation to one another, so that no adaptation work is required when the framework sections 13, 15 are joined to form a framework 11.

Figure 3A:
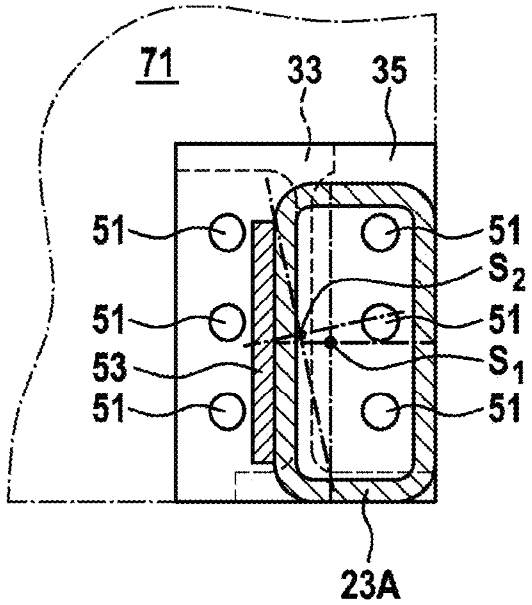
FIGS. 3A and 3B illustrate the cross sections indicated in FIG. 2 through the connection regions of the upper chord and the lower chord.
Figure 3B:
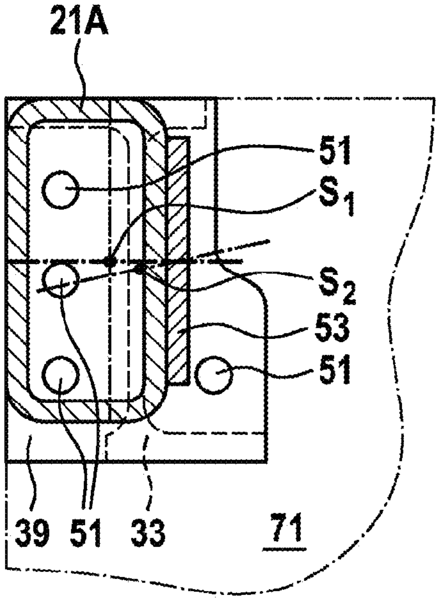

The cross section Y shown in FIG. 2 through the connection region 31 of the lower chord section 23A is shown in FIG. 3A. The cross section X shown in FIG. 2 through the connection region 31 of the upper chord section 21A is shown in FIG. 3B. The two FIGS. 3A and 3B are described together below.

Each of the junction plates 35, 39 has bores 51 for receiving the connecting elements 47, the central longitudinal axes of the bores 51 being arranged parallel to the longitudinal direction of the framework sections 13, 15 (see FIG. 2). As a result, the connecting elements 47 are subjected to tension in their longitudinal extension and not, for example, to shear or bearing stress. In the case of two junction plates 35, 39 of successive framework sections 13, 15 to be connected to one another, the hole pattern, that is to say the arrangement of the bores 51 in the junction plates 35, 39, should be identical.

As FIGS. 3A, 3B show, a flat profile 53 is joined to the side of the upper chord section 21A or lower chord section 23A; preferably welded on. This connects the connection region 31 and, as shown in FIG. 2, extends from the intermediate plate 37 at least over a certain region along the upper chord section 21A, 21B or lower chord section 23A, 23B. By welding this flat profile 53, the center of gravity $S_1$ of the upper chord section 21A, 21B or lower chord section 23A, 23B is shifted closer to the center of gravity $S_2$ of the I-profile piece 33. As a result, the torsional moments and thus the risk of lateral torsional buckling in the connection region 31 can be reduced again.

Since panels are usually to be fastened to the outer sides of the framework 11, it is particularly important that no parts such as the junction plates 35, 39 protrude beyond the lateral surfaces of the upper chords 21 and lower chords 23 in the region of these surfaces of the framework 11 to be clad. Therefore, as the cross-sections X and Y of FIGS. 3A, 3B show, the surfaces of the junction plate 35, 39, the intermediate plate 37 and the I-profile piece 33 which face away from the surrounding environment of the cuboid space 71 and extend in the longitudinal direction are arranged in alignment with the corresponding lateral surfaces of the tubular upper chord section 21A, 21B and the tubular lower chord section 23A, 23B, respectively, with respect to the longitudinal extension.

Figure 4:
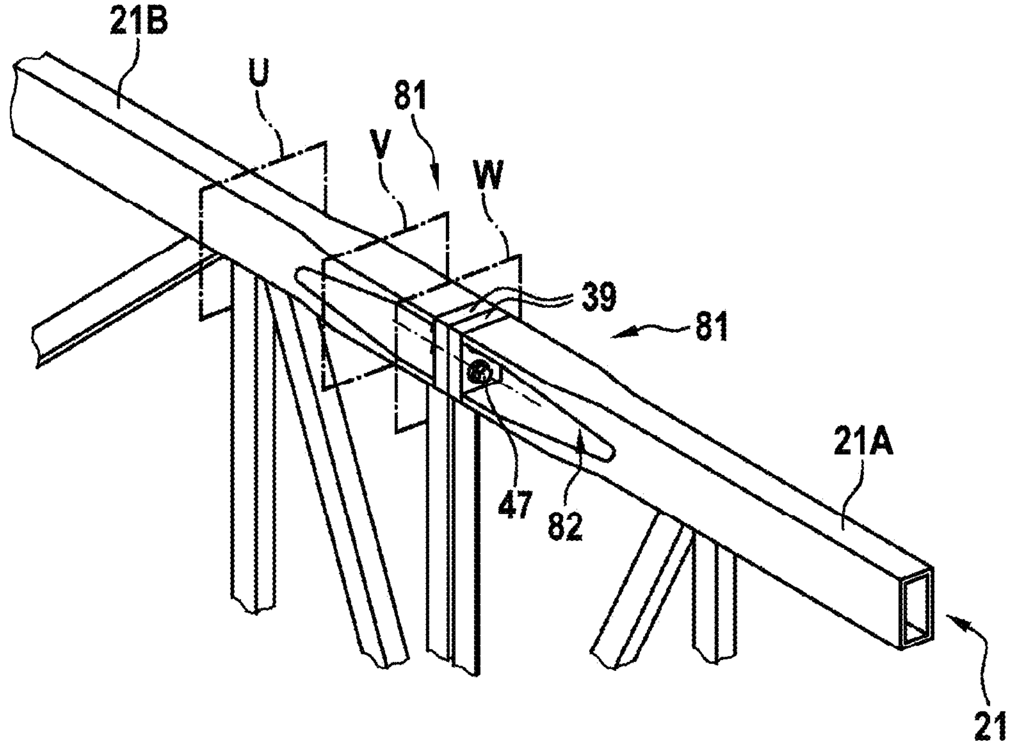
FIG. 4 illustrates, based on the upper chord, the connection region in a second variant in a three-dimensional view.
Figure 5A:
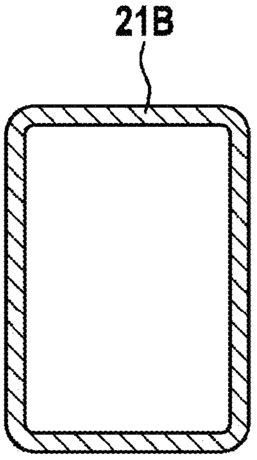
FIGS. 5A to 5C illustrate the cross sections indicated in FIG. 4 through the connection region of the upper chord.
Figure 5B:
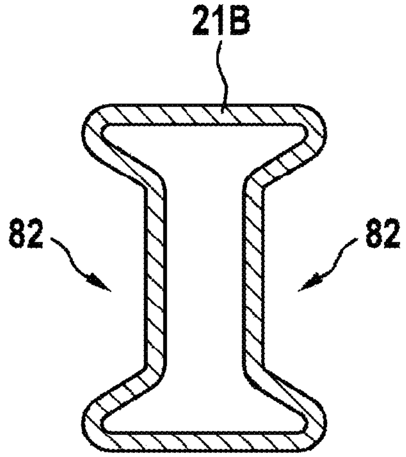
Figure 5C:
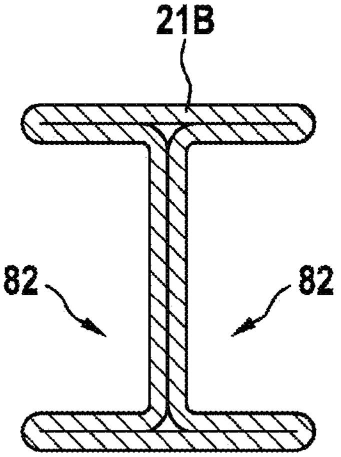

FIG. 4 shows a three-dimensional view of a connection region 81 in a second embodiment in reference to the upper chord 21 and FIGS. 5A to 5C show the cross sections U, V, W of the connection region 81 shown in FIG. 4. The second embodiment of the connection region 81 has essentially the same features relevant to the disclosure as the first embodiment of the connection region 31.

In the second embodiment of the connection region 81, the transition from the tubular cross section into the I-shaped cross section is configured continuously, not by joining an I-profile piece 33, but by means of shaping and/or molding. Forming can be carried out, for example, by hammering, forging, pressing, deep drawing and so forth of the tubular upper chord section 21A, 21B arranged in the connection region 81. Material-forming manufacturing processes, such as 3D printing processes, build-up welding and so forth, can be used for molding. As a result of the formation of lateral indentations 82 on the tubular upper chord section 21A, 21B, the square tubular cross section in the connection region 81 continuously transitions into the I-shaped cross section, as is shown schematically in FIGS. 5A, 5B and 5C. As in the first embodiment, a junction plate 39 is provided for receiving the fastening means 47 on the end face of the upper chord section 21A, 21B. It is obvious that the lower chord sections 23A, 23B may also be provided with connection regions 81 of the second embodiment in the same way.

Although the disclosure has been described by showing specific exemplary embodiments, it is obvious that numerous further embodiments can be created with the knowledge of the present disclosure, for example, by combining the features of the individual exemplary embodiments and/or interchanging individual functional units of the exemplary embodiments. A possible combination of the exemplary embodiments illustrated in FIGS. 1 to 5 would result, for example, if the tubular cross section of the upper chord section 21A, 21B or lower chord section 23A, 23B were partially deformed in the connection region 31, 81, and an I-profile piece 33 was joined to it.

The invention claimed is:

1. A framework section of a framework for a passenger transport system, the framework section comprising:
- at least one connection region formed on an end face of at least one of two ends of the framework section, wherein the connection region is configured to be connected to a connection region of at least one further framework section,
- wherein each framework section comprises two upper chord sections and two lower chord sections which extend in a longitudinal direction of the framework section parallel to one another and are connected to one another by connecting struts to define a cuboid space,
- wherein the upper chord sections and the lower chord sections comprise a tubular cross section, and
- wherein, in the connection region the upper chord sections and the lower chord sections are transition from the tubular cross section into an I-shaped cross section.

2. The framework section according to claim 1, wherein the tubular cross section comprises a square tube profile.

3. The framework section according to claim 1, wherein the transition from the tubular cross section into the I-shaped cross section is configured continuously by forming.

4. The framework section according to claim 1, wherein the transition from the tubular cross section into the I-shaped cross section comprises an end face joining of an intermediate plate and an I-profile piece on the tubular upper chord section or lower cord section and is discontinuous.

5. The framework section according to claim 4, wherein the I-profile piece has two flanges arranged in parallel planes and connected to one another by a web.

6. The framework section according to claim 5, wherein at least one of the two flanges is arranged asymmetrically with respect to the web or has a recess.

7. The framework section according to claim 4, wherein a length of the I-profile piece corresponds to one to five times a height of the tubular cross section of the upper chord section or the lower chord section.

8. The framework section according to claim 4, wherein a length of the I-profile piece corresponds to two to three times the height of the tubular cross section.

9. The framework section according to claim 4, wherein a length of the I-profile piece corresponds to two and a half times the height of the tubular cross section.

10. The framework section according to claim 1, wherein at least surfaces of the junction plate facing away from the surrounding environment of the cuboid space and extending in the longitudinal direction are arranged in alignment with the corresponding lateral surfaces of the upper chord section and the lower chord section, respectively, with respect to the longitudinal direction.

11. The framework section according to claim 1, wherein in the connection region of the framework section the junction plate of the upper chord section with a junction plate of the lower chord section are connected to each other by a vertical strut.

12. A framework of a passenger transport system having at least two framework sections according to claim 1, wherein each of the adjoining framework sections in the connection region are firmly connected to each other by one or more fasteners.

13. A passenger transport system having a framework according to claim 12 configured as an escalator or moving walk.

14. The framework section according to claim 1, wherein at an end of the upper chord section or the lower chord section that opens into the connection region, a junction plate is then arranged having a planar extent orthogonal to the longitudinal direction of the framework section on the I-shaped cross section in the connection region, via which junction plates, the framework sections can be connected to one another by means of connecting elements-.

15. The framework section according to claim 14, wherein each of the junction plates has bores for receiving the connecting elements, wherein a central longitudinal axes of the bores are arranged parallel to the longitudinal direction of the framework section and a hole pattern of the bores of two interconnectable junction plates of successive framework sections matches.

* * * * *